United States Patent [19]

Sample et al.

[11] 4,068,179

[45] Jan. 10, 1978

[54] ELECTRONIC CYCLE-SELECT SWITCHING SYSTEM

[75] Inventors: Steven B. Sample, Lincoln, Nebr.; Paul R. Scheuer, West Lafayette; Karmen D. Cox, Lafayette, both of Ind.

[73] Assignee: Design and Manufacturing Corporation, Connersville, Ind.

[21] Appl. No.: 686,811

[22] Filed: May 17, 1976

[51] Int. Cl.² .................... H03K 17/00; G01R 29/02; H03K 5/00
[52] U.S. Cl. .................................... 328/72; 307/293; 134/57 D; 134/58 D; 328/75; 328/130; 340/309.4
[58] Field of Search ................. 307/293; 328/129, 130, 328/72–75; 340/309.4; 259/1 R; 317/141 R, 141 S; 334/7, 18, 29; 325/464, 470, 456; 134/57 D, 58 D

[56] References Cited

U.S. PATENT DOCUMENTS

| | | | |
|---|---|---|---|
| 3,464,673 | 9/1969 | Cargoe et al. | 259/1 R |
| 3,602,822 | 8/1971 | Evans et al. | 334/18 |
| 3,662,186 | 5/1972 | Karklys | 307/141 R |
| 3,774,056 | 11/1973 | Sample et al. | 307/293 |
| 3,803,495 | 4/1974 | Reynolds | 325/470 |
| 3,829,784 | 8/1974 | Eshraghian | 328/130 |

Primary Examiner—Stanley D. Miller, Jr.
Attorney, Agent, or Firm—Melville, Strasser, Foster & Hoffman

[57] ABSTRACT

A cycle-select switching system for automatic appliances and the like of the type for selectively performing any one of a plurality of distinct operating cycles. The switching system comprises selection means having a plurality of outputs, each corresponding to one of the operating cycles, and a momentary contact switch for producing a control signal of variable time duration. The selection means is responsive to the control signal by sequentially advancing to the output defined by a selected time duration of the control signal and thereby initiating the operating cycle corresponding thereto.

11 Claims, 9 Drawing Figures

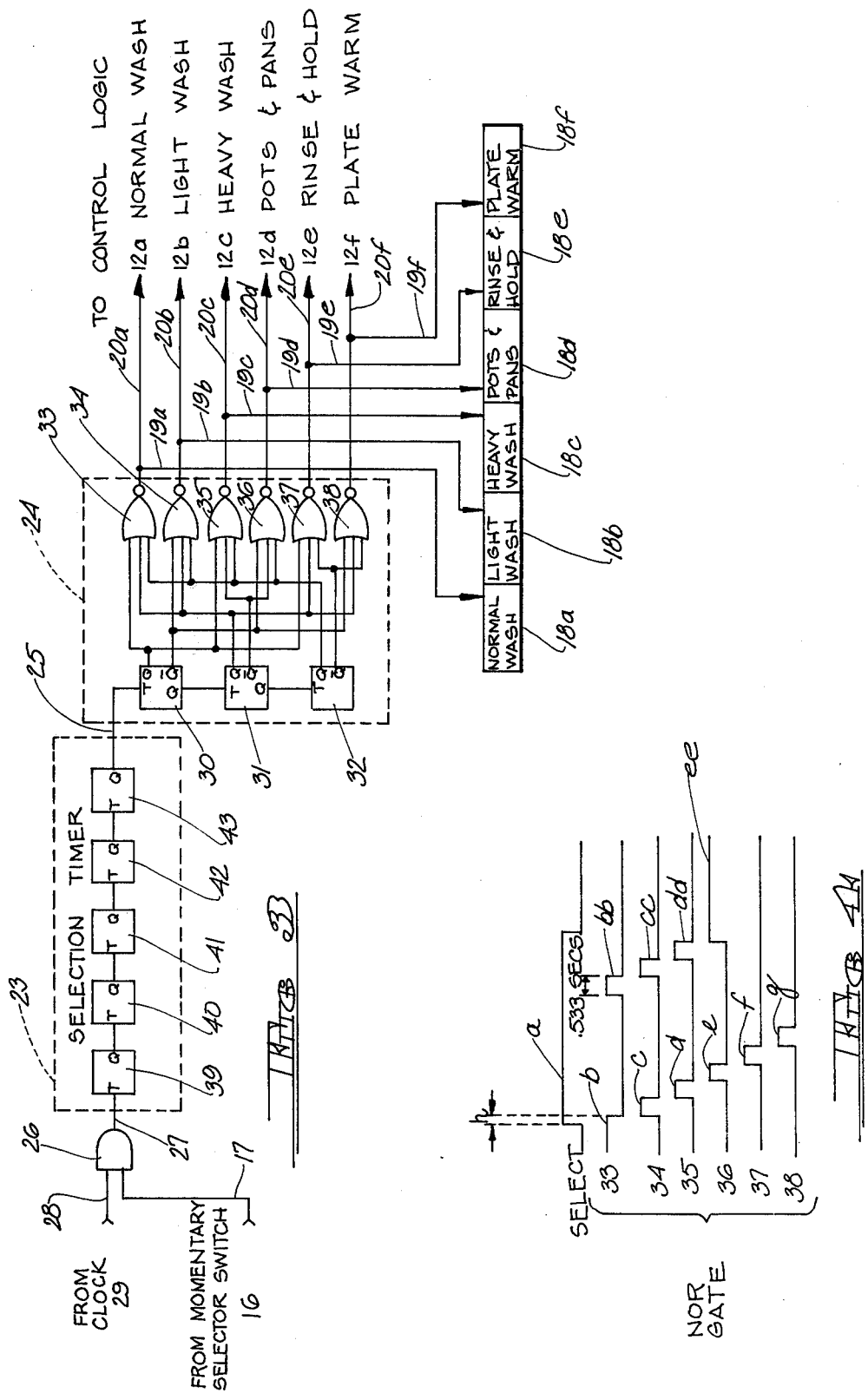

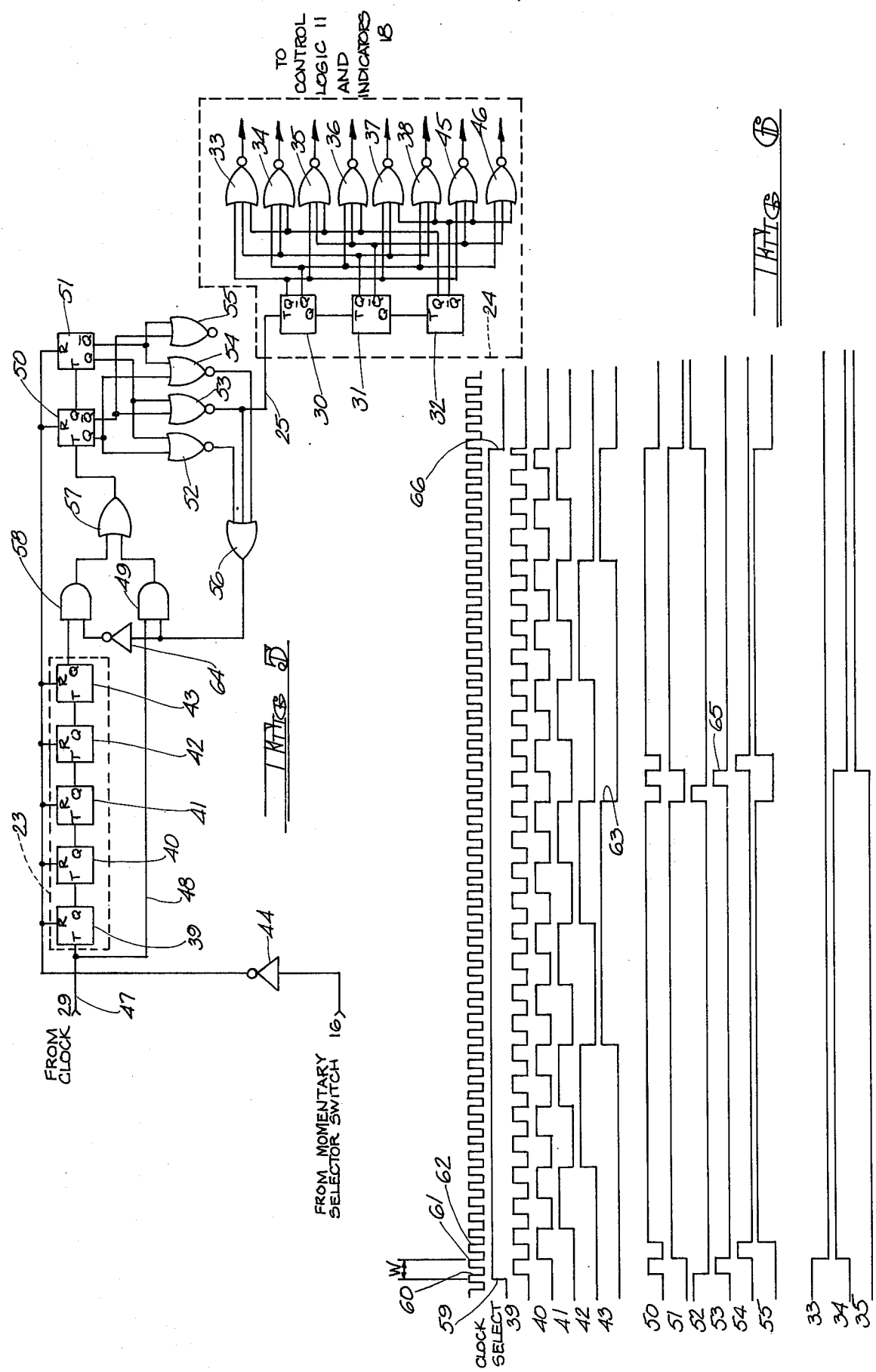

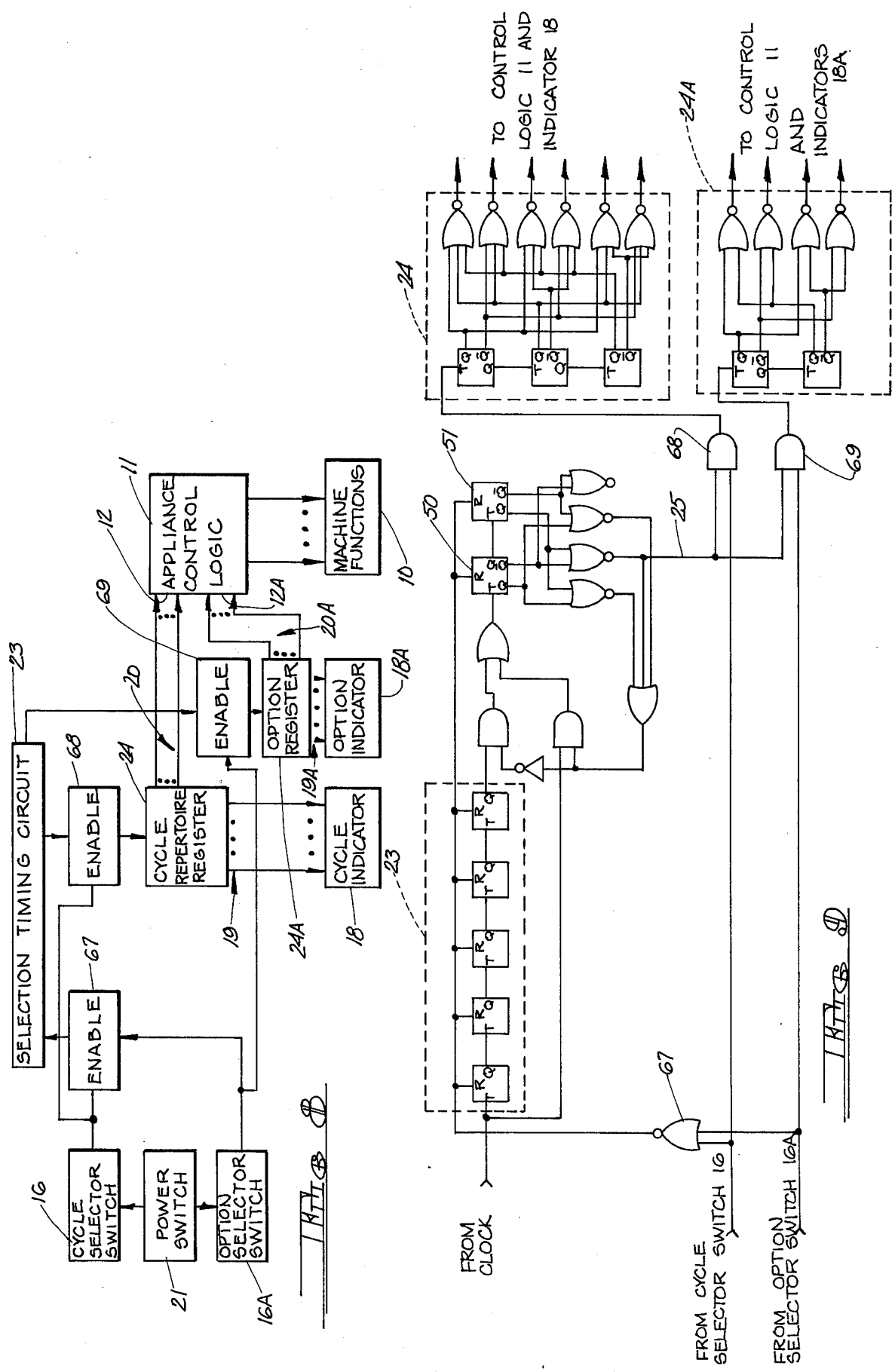

ELECTRONIC CYCLE-SELECT SWITCHING SYSTEM

BACKGROUND OF THE INVENTION

The present invention relates to switching systems for controlling the operation of machines and the like which are capable of selectively performing any one of a multiplicity of tasks. More particularly, the present invention relates to switching systems for controlling the operation of appliances which are capable of selectively performing any one of a multiplicity of predetermined cycles, each of the cycles comprising a plurality of individual operations. And, although not limited thereto, the switching system of the present invention is particularly adaptable to appliances having electronic control systems.

Present day automatic appliances are frequently designed to perform a variety of predetermined operating cycles. In most instances, a particular appliance will include a broad range of cycles designed to anticipate the needs of its user and will further include means for enabling the user to make selections from the available operating cycles. For example, in the case of an automatic dishwasher, the various operating cycles may be characterized by the types and number of individual operations, such as washes and rinses, performed as well as the length of time spent performing a particular operation or part of a cycle. In this regard, the various operating cycles are normally designated by names which are descriptive of their intended use. One such operating cycle might be designated the "Heavy Wash" cycle and may include, for example, three wash operations and five rinse operations. Another operating cycle might be designated the "Light Wash" cycle and may include only one wash operation and three rinse operations. Selection of a particular cycle from the repertoire of available cycles, is normally made by the user by means of switches on the control panel of the appliance.

In addition to a repertoire of basic operating cycles, present day appliances frequently include optional operating modes for use at the operator's discretion. Again considering an automatic dishwasher as exemplary, one such optional mode might contemplate the use of a thermostat controlled delay to assure that the water temperature reaches a certain level. This optional operating mode may be designated the "Sanitizing Delay" option. The selection of this and other optional modes is normally accomplished by means of control panel switches, similar to the switches used for cycle selection.

An appliance control system illustrative of the present day art is disclosed in U.S. Pat. No. 3,774,056, issued to Sample et al., on Nov. 20, 1973 and incorporated herein by reference. The Sample et al. patent teaches an electronic circuit for controlling the performance of a multiplicity of operating cycles. Each of the operating cycles includes a cycle-select input, which inputs may be selectively energized to initiate the corresponding operating cycle by a seven station interlocking push button switch. Other electronic appliance control systems employ rotary and toggle switches as means for selecting from the available repertoire of operating cycles. See, for example, U.S. Pat. No. 3,790,815 issued to Karkles on Feb. 5, 1974, and U.S. Pat. No. 3,464,673 issued to Cargo et al., on Sept. 2, 1969.

Prior art cycle-select switching systems of the type described above typically comprise relatively complex mechanical switching structures, frequently having mechanical interlocks to assure that only one operating cycle can be selected at a time. Complex switching structures of this type are relatively expensive and are prone to structural degradation due to the inclusion of numbers of moving parts. Moreover, as the repertoires of available operating cycles become increasingly more complex, and as more optional operating modes are added to the repertoires of basic operating cycles, the cycle-select switching systems of the prior art become correspondingly more complex and expensive.

SUMMARY OF THE INVENTION

It is a general object of the present invention to provide a cycle-select switching system which is mechanically simple, has few moving parts and is relatively inexpensive to manufacture, particularly when incorporated with an existing electronic control system.

A further object of the present invention is to provide a cycle-select switching system which may conveniently be modified so that the complexity of the repertoire of available operating cycles, including optional operating modes, may be increased at minimal cost to the overall system.

In accordance with these and other useful objects, the cycle-select switching system of the present invention, in its most basic form, comprises a single momentary contact switch and an electronic selection circuit for use in association with the control logic circuit of an automatic appliance. The appliance control logic circuit is of the type, for example, taught in the previously discussed Sample et al. patent which includes means for performing a repertoire of automatic operating cycles and includes a cycle-select input for each of the respective cycles. The selection circuit of the present invention has a single input, operatively connected to the momentary switch, and a plurality of outputs corresponding in number to the number of cycles in the repertoire, each being individually connected to a respective cycle-select input. When the selection circuit input is energized, by closing the momentary switch, the selection circuit sequentially steps through the various operating cycles defining the repertoire, stopping at each cycle for a brief interval. A group of indicator lights may be used to provide visual feedback of the action of the selection circuit. Finally, when the desired cycle is achieved, the momentary switch is released, continuously energizing the corresponding cycle-select input which, in turn, causes the appliance control logic to perform the selected operating cycle.

BRIEF DESCRIPTION OF THE DRAWINGS

FIG. 3 is a logic diagram illustrating the basic embodiment of the switching system of the present invention as shown in FIG. 2.

FIG. 4 is a timing diagram corresponding to the logic diagram of FIG. 3.

FIG. 5 is a logic diagram illustrating another embodiment of the switching system of the present invention as shown in FIG. 2.

FIG. 6 is a timing diagram corresponding to the logic diagram of FIG. 5.

FIG. 7 is another timing diagram corresponding to the logic diagram of FIG. 5.

FIG. 8 is a block diagram of another embodiment of the switching system of the present invention.

FIG. 9 is a logic diagram illustrating one means for implementing the block diagram of FIG. 8.

DESCRIPTION OF THE PREFERRED EMBODIMENTS

Figure 1:
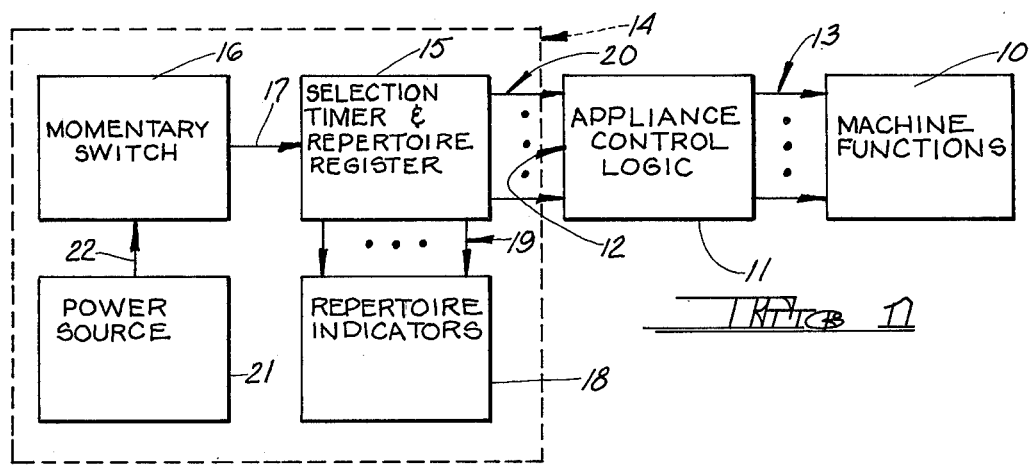
FIG. 1 is a generalized block diagram of the switching system of the present invention including blocks representing the control logic circuit and machine functions of a typical automatic appliance.

FIG. 1 is a block diagram illustrating, in a general manner, the switching system of the present invention. As described above, present day automatic appliances are typically designed to perform a variety of distinct operating cycles. Each particular operating cycle may be defined by a predetermined series of individual operations, the execution of each of which is facilitated by means of a complement of machine functions such as generally shown at 10 in FIG. 1. Thus, for each particular operating cycle, the complement of machine functions 10, which may include, for example, various motors, solenoids and other electromechanical actuators, are energized and deenergized according to a predetermined plan. Supervision and control of the complement of machine functions 10 is generally provided by means of an appliance control logic circuit such as shown at 11 in FIG. 1. The appliance control logic circuit 11, in response to information received at its cycle-select inputs 12 from signals initiated by the appliance user, causes, through a series of logical operations, a particular operating cycle to be performed by applying appropriate control signals to the complement of machine functions 10 over output lines 13. For example, as taught in the previously mentioned U.S. Pat. No. 3,774,056, which fully describes a control circuit of the type discussed above, each of the cycle-select inputs 12 may correspond to a particular operating cycle. By energizing any one of the cycle-select inputs 12, the control logic circuit 11 will energize and deenergize the machine functions 10 at appropriate times and in appropriate combinations to automatically effect performance of the corresponding operating cycle. The switching system of the present invention, shown generally within the dotted block 14 of FIG. 1, describes a unique means by which the cycle-select inputs 12 of the control logic circuit 11 may be energized to facilitate the selection of a desired operating cycle.

In its most basic form, the cycle-select switching system 14 of the present invention comprises a selection timer and repertoire register 15 connected to a momentary contact switch 16 by line 17 and to a bank of repertoire indicators 18 by a plurality of output lines 19. The selection timer and repertoire register 15 also includes a plurality of output lines 20 each connecting to a particular one of the cycle-select inputs 12 of the appliance control logic circuit 11. Finally, the momentary switch 16 is connected to a suitable source of power 21 by line 22.

Figure 2B:
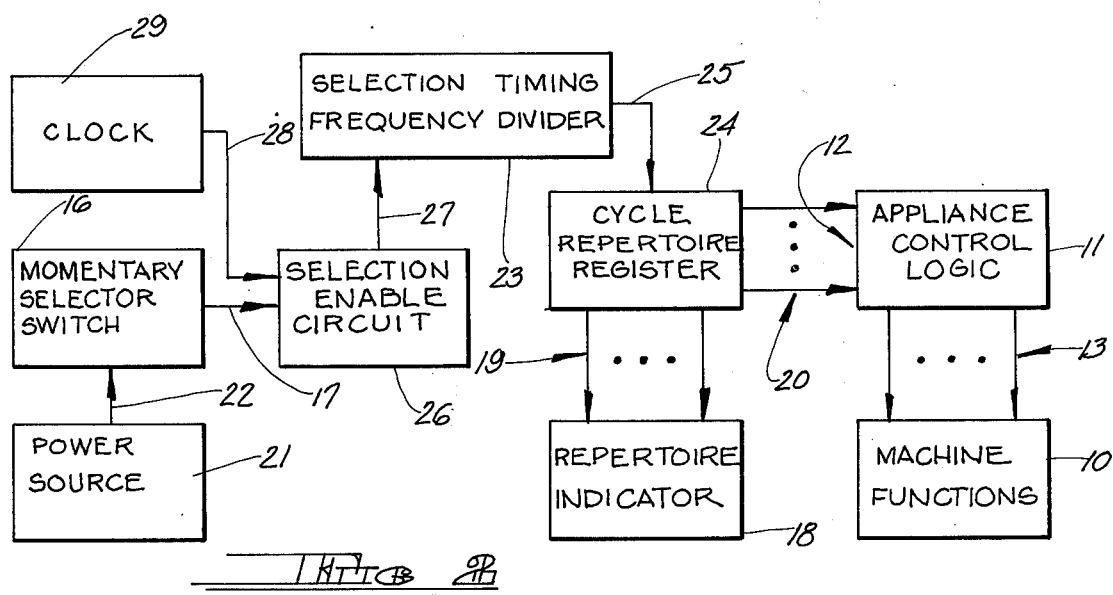
FIG. 2 is a detailed block diagram of the switching system of the present invention shown generally in FIG. 1.
Figure 2T:
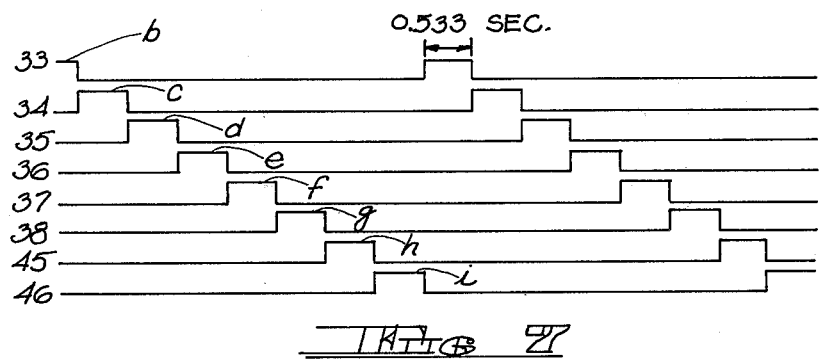

As shown in more detail in FIG. 2, the selection timer and repertoire register 15 comprises a selection timing frequency divider 23 and a cycle repertoire register 24 communicating therewith through line 25. In addition, a selection enable circuit 26 is connected between the input line 27 to the selection timing frequency divider 23 and the output lines 17 and 28 of the momentary switch 16 and a clock 29.

In operation, the appliance user initiates selection of a particular operating cycle by closing the momentary contact switch 16 and thereby applying an enabling signal from the power source 21 to the selection enable circuit 26 over lines 22 and 17. Clock pulses generated by clock 29 and applied to the enabled selection enable circuit 26 over line 28 are, in turn, applied to the selection timing frequency divider 23 over line 27. The selection timing frequency divider 23 converts the clock pulses to a train of low frequency logic transitions which are then applied by line 25 to the cycle repertoire register 24.

The cycle repertoire register 24 is characterizable by a plurality of states, each corresponding to one of the cycle-select inputs 12 of the appliance control logic 11. Furthermore, the cycle repertoire register 24 includes decoding means which relates each one of the output lines 20 to a particular one of its states. And, since each of the output lines 20 is connected to a particular one of the cycle-select inputs 12 of the appliance control logic 11, an electronic association is achieved between each state of the cycle repertoire register 24 and its corresponding cycle-select input 12. In a similar manner, each of the output lines 19 which correspond to respective ones of the output lines 20, electronically associates each of the states of the cycle repertoire register 24 to a separate indicator of the bank of repertoire indicators 18. In other words, when the cycle repertoire register 24 is characterized by any one of its states, the corresponding cycle-select input 12 will be energized by means of one of the output lines 20 and an observable indication thereof will be provided by one of the indicators of the bank of repertoire indicators 18 which is simultaneously energized by one of the output lines 19.

In response to an input signal on line 25, the cycle repertoire register 24 will sequentially advance through its states at the low frequency of the signal on line 25 so long as the selection timing frequency divider 23 is operative. Therefore, as the various states of the cycle repertoire register 24 are sequentially advanced through the corresponding cycle-select inputs 12, as well as the corresponding indicators of the bank of repertoire indicators 18, will be briefly energized in a similar sequence. When a desired one of the cycle-select inputs 12 has been energized, as indicated by activation of the corresponding one of the indicators of the bank of repertoire indicators 18, the selection timing frequency divider 23 is rendered inoperative by opening the momentary selector switch 16. As a result of rendering inoperative the selection timing frequency divider 23, the cycle repertoire register 24 will remain in, and continuously energize, the desired one of the cycle-select inputs 12. Similarly, the particular indicator of the bank of repertoire indicators 18 corresponding to the desired or selected one of the cycle-select inputs 12 will remain activated. Continuous activation of the desired one of the cycle-select inputs will cause the appliance control logic 11 to initiate the particular operating cycle corresponding thereto by activating the machine functions 10 in some predetermined sequence. It will thereby be appreciated that any one of the cycle-select inputs 12, which corresponds to a particular operating cycle, may be selected by the appliance user by initially closing the momentary selector switch 16, whereby each of the cycle-select inputs will be energized, in turn, for a short period of time, the corresponding indicator of the bank of repertoire indicators 18 showing the temporary selection. When the momentary selector switch 16 is opened, the selection timing frequency divider 23 will cease advancing the cycle repertoire register 24 and the current selection will be retained. The appliance control logic 11, thus instructed, will perform the selected cycle.

FIG. 3 is a logic diagram of one embodiment of the cycle-select switching system shown generally in FIGS. 1 and 2, and FIG. 4 is a corresponding timing diagram. It will be understood by one skilled in the art of digital logic that FIG. 4 shows the relationship between the logic signals wherein the logic 1 condition is indicated by a high signal level and the logic 0 condition is indicated by a low signal level. For exemplary purposes, the logic diagram of FIG. 3 will be discussed in terms of its application to an automatic dishwasher. Accordingly, six cycle-select inputs 12a–12f, of the type typically corresponding to operating cycles of an automatic dishwasher, are shown. Thus, cycle-select input 12a corresponds to a NORMAL WASH operating cycle, 12b to a LIGHT WASH operating cycle, 12c to a HEAVY WASH operating cycle, 12d to a POTS AND PANS operating cycle, 12e to a RINSE AND HOLD operating cycle, and 12f to a PLATE WARM operating cycle. It will be noted that each of the cycle-select inputs 12a–12f is connected to the cycle repertoire register 24 by means of a respective one of the output lines 20a–20f. It will further be noted that the bank of repertoire indicators 18 comprises a series of six indicators 18a–18f each corresponding respectively to one of the cycle-select inputs 12a–12f. And, the indicators 18a–18f are connected respectively to the output lines 20a–20f by means of lines 19a–19f. In this manner, as each cycle-select input 12a–12f is energized, the corresponding one of the indicators 18a–18f is also energized. The individual indicators 18a–18f may include rear illuminated transluscent legends, each spelling out the name of its respective operating cycle in the dishwasher's repertoire of cycles. In operation, energization of one of the lines 19a–19f will cause the legend associated with the corresponding indicator 18a–18f to be illuminated while the other legends remain dark but readable.

As shown in FIG. 3 the cycle repertoire register 24 includes a three stage binary counter comprising flip-flops 30, 31 and 32 and an associated decoding logic circuit comprising NOR gates 33–38 and associated circuitry. Each of the outputs of the NOR gates 33–38 comprise one of the output lines 20a–20f. It will be apparent to one skilled in the art of digital logic circuitry that since each flip-flop 30–32 has two possible logic states, the combination of the three stages has eight distinct logic states. The decoding logic circuitry shown in FIG. 3 provides a logic signal output for six of the eight states. The unused states provide an OFF condition for the cycle repertoire register 24 wherein none of the cycle-select inputs 12a–12f nor indicators 18a–18f are energized.

The selection timing frequency divider 23 is shown in FIG. 3 as a five stage frequency divider comprising flip-flops 39–43. If the clock 29 operates at a frequency of the power line voltage, i.e. 60 Hz, the frequency of the signal on output line 25 is 1.875 Hz. Therefore, the signal on output line 25, which operates the cycle repertoire register 24, has a period of 0.533 seconds.

With additional reference now to FIG. 4, the appliance user initiates the selection process by closing momentary selector switch 16 whereby a logic 1 pulse of variable duration is applied to one input of the selection enable AND gate 26. The selection enable AND gate 26 will thereupon apply the 60 Hz clock signal from clock 29 to the selection timing frequency divider 23 over line 27. Depending upon the initial state of the selection timing frequency divider 23, the 1.875 Hz signal will, after being delayed by possibly as much as 0.533 seconds, be applied by the selection timing frequency divider 23 to the input flip-flop 30 of the cycle repertoire register 24 over line 25. Assuming that flip-flops 30, 31 and 32 are initially in their $Q=0$ states, the decoding circuitry of the cycle repertoire register 24 will initially cause output lines 19a and 20a to be energized, output lines 19b–19f and 20b–20f remaining unenergized. Consequently, cycle-select input 12a will be energized and indicator 18a will be illuminated showing the temporary selection of the NORMAL WASH operating cycle. This condition is represented in FIG. 4 by the logical 1 level output b of NOR gate 33.

After the first logical 1–0 transition of the 1.875 Hz signal on line 25, flip-flop 30 will change to its $Q=1$ state, whereas flip-flops 31 and 32 will remain in their $Q=0$ states. This combination of states will be decoded by the decoding circuitry of the cycle repertoire register 24 whereby the output of NOR gate 34 will go logical 1, the output of the remaining NOR gates going or remaining logical 0. This condition is shown in FIG. 4 by pulse c and corresponds to energization of the LIGHT WASH operating cycle as well as the LIGHT WASH indicator 18b for a period of 0.533 seconds. Following subsequent logical 1–0 transitions of the 1.875 Hz signal on line 25, the outputs of NOR gates 35, 36, 37 and 38 are sequentially energized for 0.533 second intervals as indicated by pulses d, e, f, and g in FIG. 4. As each NOR gate output is energized, its corresponding cycle-select input is energized while the corresponding indicator provides an observable indication of the temporary selection. After a period of time corresponding to the two unused states of the cycle repertoire register 24 has expired, a similar cycling process is initiated with re-energization of the output of NOR gate 33 as indicated by pulse bb in FIG. 4. Finally, assuming that the appliance user desires to select the POTS AND PANS operating cycle, when the corresponding indicator 18d illuminates, the user opens the momentary selector switch 16 which causes the SELECT signal a in FIG. 4 to assume a logical 0 level. The AND gate 26 will therefore no longer pass the 60 Hz clock signal from clock 29 and render the selection timing frequency divider 23 unable to further advance the cycle repertoire register 24. Unable to advance, the cycle repertoire register 24 will remain in its last attained state wherein the output of NOR gate 36 is logically high as indicated by ee in FIG. 4. This continuous energization of cycle-select input 12d by the output of NOR gate 36 will initiate the POTS AND PANS operating cycle. It will be appreciated that any of the operating cycles indicated in FIG. 3 can be selected by the appliance user in a similar fashion, i.e. releasing the momentary selector switch 16 when the desired one of the indicators 18a–18f is illuminated.

The logic diagram of FIG. 5 and the corresponding timing diagrams of FIGS. 6 and 7 show another embodiment of the cycle-select switching system of the present invention. As previously mentioned with respect to the embodiment of FIG. 3, the time before the first temporary selection is made, i.e. the appearance of pulse c on output 20b of NOR gate 34, is determined by the initial condition of the selection timing frequency divider 23 and will be delayed, as indicated by interval h in FIG. 4, possibly by as much as 0.533 seconds. The appearance of an output on output line 20b is referred to as the first selection since typically output line 20a from NOR gate 33 may not be routed to a cycle-select input. The embodiment of FIG. 5, by utilizing a clock by-pass technique, eliminates the delayed initial selection exhibited by the embodiment of FIG. 3.

With regard to the embodiment of FIG. 5, it will be noted that the cycle repertoire register 24 is substantially identical to the cycle repertoire register 24 shown in FIG. 3 except that two additional NOR gates 45 and 46, and corresponding outputs, have been included in the decoding circuitry, to decode all eight possible combinations of states of the three stage register. The inclusion of NOR gates 45 and 46 simply permits adaptation of the cycle-select switching system of the present invention to an appliance having a repertoire of a larger number of operating cycles. Otherwise, the cycle repertoire register 24 shown in FIG. 5 operates in response to input pulses on line 25 in a manner identical to that previously discussed with respect to FIG. 3 which discussion, for purposes of brevity, will not be repeated.

Operation of the switching system in accordance with the logic diagram of FIG. 5 is conveniently explained with reference to the timing diagram of FIG. 6. Initially, a clock signal, typically having a frequency of 60 Hz, is directly applied over line 47 to the T input of the first flip-flop 39 of the selection timing frequency divider 23. The clock signal is also applied over by-pass line 48 to one input of AND gate 49. The select command signal from momentary selector switch 16 is coupled through inverter 44 to the R inputs of flip-flops 39–43 of the selection timing frequency divider 23 and also to the R inputs of flip-flops 50 and 51. Prior to the generation of a select command signal by closing momentary selector switch 16, the logical 1 output of inverter 44 maintains flip-flops 39–43, 50 and 51 in their $Q=0$ states and thereby inhibits any switching of the aforementioned flip-flops. Furthermore, since both flip-flops 50 and 51 are in their $Q=0$ states, the output of NOR gate 52 will be logical 1 whereas the outputs of NOR gates 53, 54 and 55 will be logical 0. The logical 1 output of NOR gate 52 is applied through OR gate 56 to the lower or second input of AND gate 49, thereby enabling AND gate 49 to pass the clock signal on by-pass line 48 to one input of OR gate 57. The clock signal is then applied by OR gate 57 to the T input of flip-flop 50. Finally, and assuming that prior to the generation of a select command signal by momentary selector switch 16, flip-flops 30, 31 and 32 of cycle repertoire register 24 are in their $Q=0$ states, it will be appreciated that the output of decoding NOR gate 33 will be logical 1. It is convenient to identify this condition, prior to any selection, as the OFF condition. Consistent with such an identification, the output of NOR gate 33 is considered the OFF output, and may be used to operate an OFF indicator.

It will be noted that the aforementioned conditions, i.e. before the generation of a select command signal, are represented by the waveforms in the timing diagram of FIG. 6 to the left of point 59. At point 59 the select command signal is generated and applied through inverter 44 to enable flip-flops 39–43, 50 and 51. Subsequently, the first logical 1–0 transition 60 of the clock signal, applied to flip-flop 50 over the clock by-pass network comprising line 48, AND gate 49 and OR gate 57, will cause flip-flop 50 to switch to its $Q=1$ state. As a result, the output of NOR gate 53, the input 25 to the cycle repertoire register 24, will go to logical 1, the output of NOR gate 52 will go to logical 0, and the outputs of NOR gates 54 and 55 will remain at logical 0. The logical 1 output of NOR gate 53 is applied through OR gate 56 to maintain AND gate 49 enabled so that the clock signal may be passed therethrough and through OR gate 57 to the T input of flip-flop 50.

On the second logical 1–0 transition 61 of the clock signal, flip-flop 50 switches back to its $Q=0$ state and the transition causes flip-flop 51 to switch to its $Q=1$ state. Consequently, the output of NOR gate 54 goes to logical 1, the output of NOR gate 53 goes to logical 0, and the output of NOR gates 52 and 55 remain at logical 0. The resulting logical 1–0 transition of the output of NOR gate 53 indexes the cycle repertoire register 24 so as to cause energization of the output of NOR gate 34. It will be noted that this selection, energization of the output of NOR gate 34 and deenergization of NOR gate 33 (the OFF gate), will occur between one and two periods of the clock signal after generation of the select command signal at point 59 (see interval w in FIG. 6). For a 60 Hz clock, the maximum interval would, therefore, be 0.032 seconds.

On the next or third logic 1–0 transition 62 of the clock signal 29, the output of NOR gate 55 will go to logical 1, the output of NOR gate 54 will go to logical 0, and the outputs of NOR gates 52 and 53 will remain at logical 0. As a result, the output of OR gate 56 goes to logical 0 disenabling AND gate 49 blocking the application of the clock signal to flip-flop 50. Now, the next indexing operation of the cycle repertoire register 24 is under the control of the selection timing frequency divider 23. Thus, the first logical 1–0 transition 63 of flip-flop 43 which is applied through AND gate 58, enabled by the logical 1 output of inverter 64, causes flip-flops 50 and 51 to assume their $Q=0$ states. This causes a logical 1 level signal to appear at the output of NOR gate 52, again allowing the application of clock pulses through AND gate 49 and OR gate 57 to flip-flop 50. And, as previously explained, subsequent logical 1–0 transitions of the clock signal applied to flip-flop 50 sequentially cause the outputs of NOR gates 53, 54 and 55 to assume a logical 1 condition, the logical 1–0 transition 65 of the output of NOR gate 53 causing the cycle repertoire register 24 to energize the output of NOR gate 35 0.533 seconds after the previous temporary selection (assuming that a 60 Hz clock signal is utilized). If the operating cycle corresponding to the output of NOR gate 35 is desired to be finally selected, the select command signal may be terminated by the user, such as at 66, whereby the logical 1 output of inverter 44 resets flip-flops 39–43, 50 and 51 and causes the output of NOR gate 52 to assume a logical 1 condition, ready for the next command. It will be appreciated that, of course, the output of NOR gate 35 will remain energized to initiate, by means of the appliance control logic circuit 11, the corresponding operating cycle of the appliance.

The timing diagram of FIG. 7 shows the sequential activation of the cycle-select inputs 12 through use of the circuit embodied in FIG. 5. For a 60 Hz clock signal the pulse width of each temporary selection is approximately 0.533 seconds and the first selection, i.e. energization of output 34, occurs substantially immediately after the generation of the select command signal by the momentary selector switch 16. It will also be noted that since all possible states of flip-flops 30, 31 and 32 are decoded in the FIG. 5 embodiment, there is no time gap between energization of the last NOR gate 46 of the decoding circuitry and the first NOR gate 33. As explained with respect to FIGS. 2 and 3, selection of a particular operating cycle is simply accomplished by opening the momentary selector switch 16 when the corresponding one of the indicators 18 is activated by one of the outputs of NOR gates 33-38, 45 and 46. It will be recalled that the indicators 18 are sequentially activated in response to the cycle repertoire register 24 output pulses b-i.

The block diagram of FIG. 8 and the corresponding logic diagram of FIG. 9 disclose a further embodiment of the cycle-select switching system of the present invention. In the embodiment shown in FIGS. 8 and 9, the selection circuitry is expanded to allow the operator to select optional operating modes in addition to the basic repertoire of operating cycles of the appliance. An example of an optional operating mode found frequently in present day dishwashers is a thermostat controlled delay to insure sanitization of dishes. Another example of an optional feature might be called "selectable timing", wherein the appliance operator may select the time interval for a part of an operating cycle from among several possible time intervals.

It will be recognized that the various circuitry shown in FIGS. 8 and 9 dealing with the selection of an operating cycle is substantially identical to the circuitry of the embodiments of the present invention previously discussed. Accordingly, FIGS. 8 and 9 show a cycle selector switch 16, a selection timing circuit 23, a cycle repertoire register 24 having outputs 19 and 20, a bank of cycle indicators 18, and an appliance control logic circuit 11 including appropriate machine functions 10. In addition, the embodiment of FIGS. 8 and 9 include various components peculiar to the selection of optional operating modes. Specifically, an option-selector switch 16A, which may be substantially identical to the cycle-selector switch 16, an option register 24A, which may be substantially identical to the cycle repertoire register 24, and a bank of option indicators 18A are shown. Furthermore, option register 24A includes output lines 19A and 20A interfacing with the option indicators 18A and the option-select inputs 12A of the appliance control logic circuit 11 in a manner similar to lines 19 and 20 of the cycle repertoire register 24. Finally, it will be noted that a series of enabling gates 67, 68 and 69 are included in the embodiment of FIGS. 8 and 9.

In operation, either a cycle-select or an option-select signal is initially generated by closing either cycle-selector switch 16 or option-selector switch 16A. As a result of this initial selection, the output of NOR gate 67 will go to logical 0, enabling timing pulses to be applied to the first inputs of AND gates 68 and 69 over line 25 in the manner previously described. Depending upon whether a cycle-select signal or an option-select signal was generated, one of the AND gates 68, 69 will pass the signal on line 25 to either the cycle repertoire register 24 or the option register 24A. The activated register 24 or 24A will then make temporary selections by sequentially energizing over lines 20 or 20A its respective cycle-select or option-select inputs 12 and simultaneously energizing over lines 19 or 19A the corresponding ones of the cycle or option indicators 18 or 18A. When the desired indicator is activated, the cycle selector or option selector switch 16, or 16A is opened and the selection is completed. Thereupon, the flip-flops of the selection timing frequency divider 23 as well as flip-flops 50 and 51 are reset to their initial Q=0 states.

It will be noted that in the embodiment of FIGS. 8 and 9 a single selection timing frequency divider 23 operates both the cycle repertoire register 24 and the option register 24A. It will be understood by one skilled in the art that plural timing circuits could be utilized for this purpose and also that the present invention is not limited to two selection inputs as shown, but may contain as many inputs and registers as required to provide the operator with the desired flexibility in the control of the appliance. Also, although the embodiments of the present invention shown in FIGS. 8 and 9 is illustrated in connection with the clock by-pass technique shown in FIG. 5, it will be appreciated that this embodiment can also be implemented in connection with the basic logic diagram shown in FIG. 3. Finally, it will be understood by one skilled in the art that many of the components of the present invention may be represented by various combination of logic elements, and that the particular logic elements shown are not intended to be limiting.

Further modifications may be made in the invention without departing from the spirit of it. The embodiments of the invention in which an exclusive property or privilege is claimed are defined as follows:

We claim:

1. In a machine of the type having an electronic digital control system including a control logic circuit capable of carrying on a plurality of operating cycles, each cycle comprising a plurality of events performed by a number of machine devices, each of said operating cycles being selectable by energizing a corresponding cycle-select input of said control logic, the improved switching system for selecting any desired operating cycle in combination therewith comprising:
 a. generating means for producing a control signal;
 b. a momentary contact switch having an input connected to said control signal and having an output; and
 c. selection means having an input connected to said output of said momentary contact switch and having a plurality of outputs, each of said outputs of said selection means being connected to a corresponding cycle-select input, said outputs repeatedly energizing sequentially each of said cycle-select inputs for a predetermined period shorter than the duration of the corresponding operating cycle as long as said control signal remains connected to said input of said selection means through said momentary contact switch.

2. A switching system according to claim 1 including a plurality of indicators, each indicator connected to a corresponding one of said outputs and providing an observable indication when the corresponding cycle — select input is energized.

3. A switching system according to claim 2 wherein said selection means comprises:
 a. timing means connected for receiving said control signal and producing a train of low frequency clock pulses as long as said control signal is connected to said selection means;
 b. circuit means responsive to said timing means and uniquely characterizeable by any one of a plurality of sequential states, each of said states corresponding to one of said outputs; and
 c. decoding means responsive to said circuit means for decoding said plurality of sequentially achievable states and for producing one of said plurality of outputs whenever said circuit means is characterized by the corresponding one of said plurality of states.

4. A switching system according to claim 3 wherein said generating means comprises a power source.

5. A switching system according to claim 3 wherein said timing means comprises clock means for generating a train of clock pulses, an AND gate having a first input for receiving said train of clock pulses and a second input for receiving said control signal, and a frequency divider network connected for converting the output of said AND gate into said low frequency train of clock pulses.

6. The switching system according to claim 5 wherein said generating means comprises a power source.

7. A switching system according to claim 3 wherein said timing means comprises:
   a. clock means for generating a train of clock pulses;
   b. a frequency divider connected for reducing the frequency of said train of clock pulses in response to said control signal; and
   c. a clock by-pass network connected for receiving said train of clock pulses of reduced frequency from said frequency divider and said train of clock pulses from said clock means and for generating, in response to said control signal, said low frequency train of clock pulses such that said circuit means is caused to initially change state substantially immediately after sad generating means has been connected to said selection means and to thereafter change state at the frequency of said low frequency train of clock pulses.

8. In a machine of the type having an electronic digital control system including a control logic circuit capable of carrying on a plurality of operating cycles, each cycle comprising a plurality of events performed by a number of machine devices, each of said operating cycles being selectable by energizing a corresponding cycle-select input to said control logic, the improved switching system for selecting a plurality of desired operating cycles in combination therewith comprising:
   a. generating means producing a plurality of control signals;
   b. a momentary contact switch for each of said control signals, each of said momentary contact switches having an input connected to its respective one of said control signals, and having an output; and
   c. selection means having a plurality of inputs, each of said inputs connected to a corresponding output of said momentary contact switch, said selection means having a plurality of sets of outputs, each of said outputs of each set being connected to a corresponding cycle-select input, said outputs of each set repeatedly energizing sequentially each of said corresponding cycle-select inputs for a predetermined period shorter than the duration of the corresponding operating cycle as long as said corresponding control signal remains connected to its respective input of said selection means through said corresponding momentary contact switch.

9. A cycle-select switching system comprising:
   a. generating means for producing a control signal;
   b. a momentary contact switch having an input connected to said control signal and having an output; and
   c. selection means having an input connected to said output of said momentary contact switch and having a plurality of outputs which are repeatedly energized sequentially as long as said control signals remains connected to said selection means through said momentary contact switch.

10. A switching system according to claim 9 wherein said selection means comprises
    a. means for generating a clock signal;
    b. frequency divider network responsive to said clock signal and said control signal, and producing a train of low frequency clock pulses;
    c. a register responsive to said train of low frequency clock pulses and shiftable through a plurality of states;
    d. decoding means having an output comprising said plurality of outputs and decoding said states of said register to sequentially energize said plurality of outputs.

11. A switching system according to claim 9 including a plurality of indicators, each indicator connected to a corresponding one of said outputs of said selection means to provide an observable indication when the corresponding output is energized.

* * * * *